(12) United States Patent
Bando et al.

(10) Patent No.: US 8,575,888 B2
(45) Date of Patent: Nov. 5, 2013

(54) WIND-DRIVEN ELECTRICITY GENERATION SYSTEM OF TYPE HAVING STORAGE BATTERY AND DEVICE FOR CONTROLLING CHARGE AND DISCHARGE OF STORAGE BATTERY

(75) Inventors: Matsuo Bando, Tokyo (JP); Tomio Tamakoshi, Nagoya (JP); Yoshinori Sakanaka, Tokyo (JP)

(73) Assignee: Japan Wind Development Co., Ltd., Tokyo (JP)

( * ) Notice: Subject to any disclaimer, the term of this patent is extended or adjusted under 35 U.S.C. 154(b) by 363 days.

(21) Appl. No.: 13/142,179

(22) PCT Filed: Dec. 26, 2008

(86) PCT No.: PCT/JP2008/073818
§ 371 (c)(1),
(2), (4) Date: Jun. 24, 2011

(87) PCT Pub. No.: WO2010/073394
PCT Pub. Date: Jul. 1, 2010

(65) Prior Publication Data
US 2011/0260677 A1    Oct. 27, 2011

(51) Int. Cl.
*H01M 10/46* (2006.01)

(52) U.S. Cl.
USPC .......................................................... 320/101

(58) Field of Classification Search
USPC ................. 320/101, 103, 107, 114, 128, 132; 290/43, 44, 54, 55
See application file for complete search history.

(56) References Cited

U.S. PATENT DOCUMENTS

| | | | |
|---|---|---|---|
| 2006/0249957 A1* | 11/2006 | Ito et al. | 290/44 |
| 2007/0035135 A1* | 2/2007 | Yoshida | 290/44 |
| 2008/0179887 A1 | 7/2008 | Kawazoe et al. | |
| 2009/0079195 A1* | 3/2009 | Ito et al. | 290/44 |

FOREIGN PATENT DOCUMENTS

| | | |
|---|---|---|
| CN | 101232192 A | 7/2008 |
| JP | 11-262186 A | 9/1999 |
| JP | 11-262187 A | 9/1999 |
| JP | 11-299106 A | 10/1999 |
| JP | 2000-308370 A | 11/2000 |
| JP | 2001-346332 A | 12/2001 |
| JP | 2003-333752 A | 11/2003 |
| JP | 2004-289896 A | 10/2004 |
| JP | 2004-301116 A | 10/2004 |
| JP | 2008-236821 A | 10/2008 |

OTHER PUBLICATIONS

Office Action in counterpart Chinese Patent Application No. 200880132539.5 issued on Mar. 20, 2013.

* cited by examiner

*Primary Examiner* — Edward Tso
(74) *Attorney, Agent, or Firm* — Novak Druce Connolly Bove + Quigg LLP

(57) ABSTRACT

An instantaneous response component representing the actual amount of power generation by a wind-driven electricity generator (1) is detected, and a charge/discharge control section (14) controls charge and discharge of a storage battery (4) according to variation in the instantaneous response component. Further, based on the amount of variation in the instantaneous response component, a pattern information selection section (16) selects, out of patterns, a control region to be allocated for charge/discharge control performed according to variation in the instantaneous response component and applies the selected pattern to charge/discharge control performed by the charge/discharge control section (14). By this, an appropriate control region having less excess or deficiency can be dynamically allocated to the storage battery (4) according to the actual amount, which varies depending on wind conditions, of electric power generation by the wind-driven electricity generator (1).

8 Claims, 6 Drawing Sheets

|  | PATTERN A | PATTERN B | PATTERN C |
|---|---|---|---|
| INSTANTANEOUS RESPONSE ELEMENT P | 1M | 2M | 3M |

| $dP/dt < x$ | $x \leq dP/dt < y$ | $y < dP/dt$ |
|---|---|---|
| PATTERN A | PATTERN B | PATTERN C |

|  | PATTERN A | PATTERN B | PATTERN C |
|---|---|---|---|
| INSTANTANEOUS RESPONSE ELEMENT P | 0.5M | 1M | 1.5M |
| FIRST ORDER LAG ELEMENT Q | 1M | 2M | 2.5M |

WIND-DRIVEN ELECTRICITY GENERATION SYSTEM OF TYPE HAVING STORAGE BATTERY AND DEVICE FOR CONTROLLING CHARGE AND DISCHARGE OF STORAGE BATTERY

CROSS REFERENCE TO RELATED APPLICATIONS

This application is a National Phase filing under 35 U.S.C. §371 of PCT/JP2008/073818 filed on Dec. 16, 2008, the entire contents of which are hereby incorporated by reference.

TECHNICAL FIELD

The present invention relates to a wind-driven electricity generation system of a type having a storage battery and a device for controlling a charge and discharge of a storage battery, and more particularly to a technique for stabilizing a power output to a circuit linked to a wind-driven electricity generator without an influence by an air quantity.

BACKGROUND ART

In general, a wind-driven electricity generator generates a power upon receipt of a natural wind. For this reason, an output power is greatly influenced by a fluctuation in a wind speed. In order to supply a power generated by the wind-driven electricity generator to a power line (referred to as a "circuit") of a power company, the wind-driven electricity generator is jointed (linked) to the circuit. However, the fluctuation in the output of the wind-driven electricity generator which is caused by the fluctuation in the wind speed causes a quantity of the power to be supplied to the circuit momentarily.

In the circuit, a power in an equal quantity to that of a power to be consumed should be supplied at the same time. For this reason, the power company predicts a time variation in the consumed power to be changed momentarily and makes a power supplying plan to the circuit in conformity therewith. In order to easily implement the power supplying plan, an unstable power having a non-constant output cannot be permitted to flow into the circuit. In the case in which a wind-driven electricity generation system for linking a wind-driven electricity generator to a circuit is introduced, it is required to suppress a fluctuation in a power output to a circuit.

In order to suppress the fluctuation in the power output to the circuit, conventionally, there is proposed a wind-driven electricity generator of a type having a storage battery. The wind-driven electricity generator of a type having a storage battery uses a part of a power generated by the wind-driven electricity generator for a power storage to control a charge and discharge so that an almost constant power can be supplied to the circuit without an influence by an air quantity. There are some wind-driven electricity generators for charging/discharging a storage battery to cancel a fluctuation in a quantity of power generation through the wind-driven electricity generator with respect to a target power quantity to be made constant and supplying, to a circuit, a power obtained by synthesizing a power generation quantity of the wind-driven electricity generator and charging/discharging quantities of the storage battery, thereby suppressing a fluctuation in the output power of the wind-driven electricity generator as seen from the circuit (for example, see Patent Documents 1 to 3).

Moreover, there is also proposed a wind-driven electricity generation system for predicting a wind condition to smooth an output power of a wind-driven electricity generator (for example, see Patent Documents 4 and 5). The wind-driven electricity generation system described in the Patent Documents 4 and 5 predicts a quantity of power generation in the near future from the output power of the wind-driven electricity generator through a calculation to control a charge and discharge of a storage battery by setting the predicted quantity of power generation to be a reference (target). In other words, when the quantity of power generation of the wind-driven electricity generator is larger than the predicted quantity of power generation, an excessive part is charged into the storage battery. On the other hand, when the quantity of power generation is smaller than the predicted quantity of power generation, an insufficient part is discharged from the storage battery and the quantity of power generation of the wind-driven electricity generator is synthesized with the quantity of the charge and discharge of the storage battery. Consequently, a fluctuation in the output power of the wind-driven electricity generator is suppressed to draw a curve obtained by smoothing a locus of the quantity of an output power.

Patent Document 1: Japanese Laid-Open Patent Publication No. 11-299106
Patent Document 2: Japanese Laid-Open Patent Publication No. 2000-308370
Patent Document 3: Japanese Laid-Open Patent Publication No. 2003-333752
Patent Document 4: Japanese Laid-Open Patent Publication No. 2004-289896
Patent Document 5: Japanese Laid-Open Patent Publication No. 2004-301116

DISCLOSURE OF THE INVENTION

As described above, in a system in which a wind-driven electricity generator is provided with a storage battery to control a charge and discharge of the storage battery, thereby smoothing a power output to a circuit, the charge and discharge of the storage battery is controlled corresponding to a quantity of power generation of the wind-driven electricity generator which fluctuates momentarily depending on a wind condition. More specifically, as in the Patent Documents 1 to 5, the charge and discharge is controlled over the whole storage battery in order to cancel the fluctuation in the output power of the wind-driven electricity generator with respect to a target power quantity. In this case, only a capacity (a residual charge and discharge capacity) other than a capacity part used actually for the charge and discharge control corresponding to the fluctuation in the power in a total capacity of a storage battery is a capacity part for storing a power to continuously supply a stable power to the circuit.

However, a fluctuation range based on the target power quantity of the power generated by the wind-driven electricity generator is unknown. For this reason, it is impossible to accurately grasp the residual charge and discharge capacity which can be used for the continuous power supply to the power circuit. For this reason, it is necessary to estimate the residual charge and discharge capacity to be somewhat small. In addition, the fluctuation range of the generated power is increased in the heavy weather. Therefore, it is necessary to actually estimate the residual charge and discharge capacity to be very small by anticipating the great fluctuation range. For this reason, there is a problem in that it is impossible to realize a planned power transmission in which advantage of a charge and discharge function of a storage battery is taken to supply, to a circuit, a stable power which is as much as possible. In order to solve the problem, it is an object of the invention to effectively exhibit a charge and discharge function of a storage battery provided in a wind-driven electricity generator, thereby enabling a planned supply, to a circuit, of a stable power which is as much as possible.

In order to achieve the object, in the invention, an instantaneous value of a quantity of a power generated by a power wind generator is detected as an instantaneous response element, and one of charge and discharge control regions representing a capacity of a storage battery to be assigned to a control of a charge and discharge depending on a fluctuation in a quantity of power generation is selected from patterns and is applied to the charge and discharge control based on a variation per unit time of the instantaneous response element.

According to the invention having the structure described above, the charge and discharge control region is assigned based on an actual measured value (an instantaneous response element) of the quantity of the power generated by the wind-driven electricity generator. In addition, a size of the charge and discharge control region is adaptively changed depending on the variation per unit time of the instantaneous response element. More specifically, the charge and discharge control region is set to be decreased when the variation in the instantaneous response element is small, and to be increased when the variation in the instantaneous response element is large.

Consequently, it is possible to dynamically assign an appropriate charge and discharge control region in an almost proper quantity to the storage battery corresponding to the variation per unit time of the instantaneous response element. A residual part (a DC part) other than a capacity part assigned to the charge and discharge control region in a total capacity of the storage battery can be utilized for intentionally supplying a stable power to a circuit. Even if a part of the total capacity of the storage battery is assigned to the charge and discharge control region, a power storage function of the whole storage battery can be prevented from being lost.

The variation per unit time of the instantaneous response element is changed depending on a wind condition. Accordingly, it is possible to set, to the storage battery, the DC part to be maximized occasionally depending on the wind condition. Thus, it is possible to intentionally supply, to the circuit, a stable power which is as much as possible depending on the wind condition by making full use of the charge and discharge function of the storage battery provided in the wind-driven electricity generator.

BEST MODE FOR CARRYING OUT THE INVENTION

Figure 1:
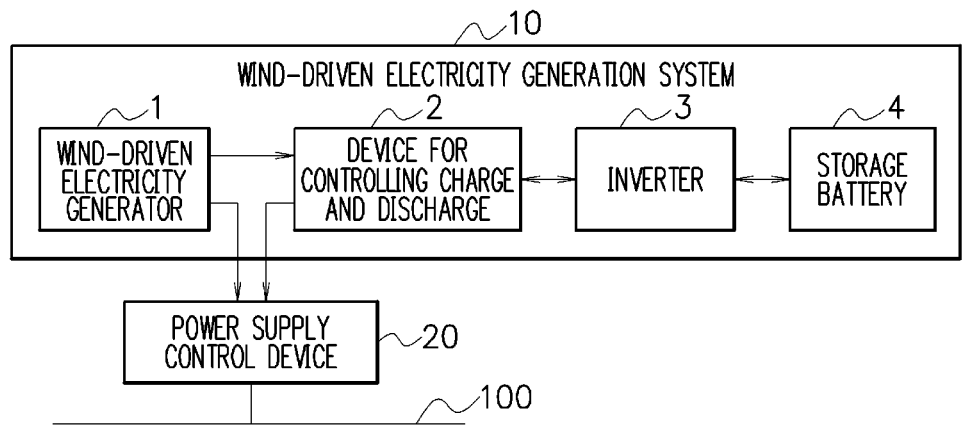
FIG. 1 is a diagram showing an example of a whole structure of a wind-driven electricity generation system of a type having a storage battery according to a first embodiment.

An embodiment according to the invention will be described below with reference to the drawings. FIG. 1 is a diagram showing an example of a whole structure of a wind-driven electricity generation system 10 of a type having a storage battery according to a first embodiment. As shown in FIG. 1, a wind-driven electricity generation system 10 according to the first embodiment includes a wind-driven electricity generator 1, a device 2 for controlling a charge and discharge, an inverter and a storage battery 4. Moreover, the wind-driven electricity generation system 10 according to the first embodiment is linked to a circuit 100 of a power company through a power supply control device 20.

The wind-driven electricity generator 1 is driven by a wind power and generates a power to be supplied to the circuit 100. More specifically, the wind-driven electricity generator 1 has a structure in which a tower portion is formed on a base and a windmill of a propeller type is provided in an upper part of the tower portion. A blade to be a vane (wing) portion of the windmill of the propeller type is attached to a rotating shaft through a hub and is constituted to be rotatable together with the rotating shaft upon receipt of a wind. There is employed a structure in which a power generator is coupled to a rotating shaft and a power generated by the generator is output to an outside of the power wind generator 1 through a power cable. The blade serves to convert a wind power energy into a rotating force upon receipt of a wind, and the generator serves to convert a rotating energy of the blade into a power.

The storage battery 4 serves to store a part of a power generated by the wind-driven electricity generator 1 through a charge and discharge. The device 2 for controlling a charge and discharge serves to control the charge and discharge of the storage battery 4. The details of the contents of the control will be described below with reference to FIG. 2. The inverter 3 serves to carry out a DC/AC conversion processing. More specifically, the inverter 3 converts an AC power supplied from the device 2 for controlling a charge and discharge into a DC power and supplies the DC power to the storage battery 4 in charging, and converts the DC power supplied from the storage battery 4 into an AC power and supplies the AC power to the device 2 for controlling a charge and discharge in discharging.

The power supply control device 20 controls a power to be supplied to the circuit 100 by using a power generated by the wind-driven electricity generator 1 and a power discharged from the storage battery 4 through the device 2 for controlling a charge and discharge. For example, the power supply control device 20 controls a power obtained by synthesizing a quantity of power generation of the wind-driven electricity generator 1 with that of the charge and discharge of the storage battery 4 so as to be supplied to the circuit 100. Through the execution of the control, a fluctuation in a power output from the wind-driven electricity generator 1 can be suppressed as seen from the circuit 100 so that the power to be supplied to the circuit 100 can be smoothed to be constant.

Figure 2:
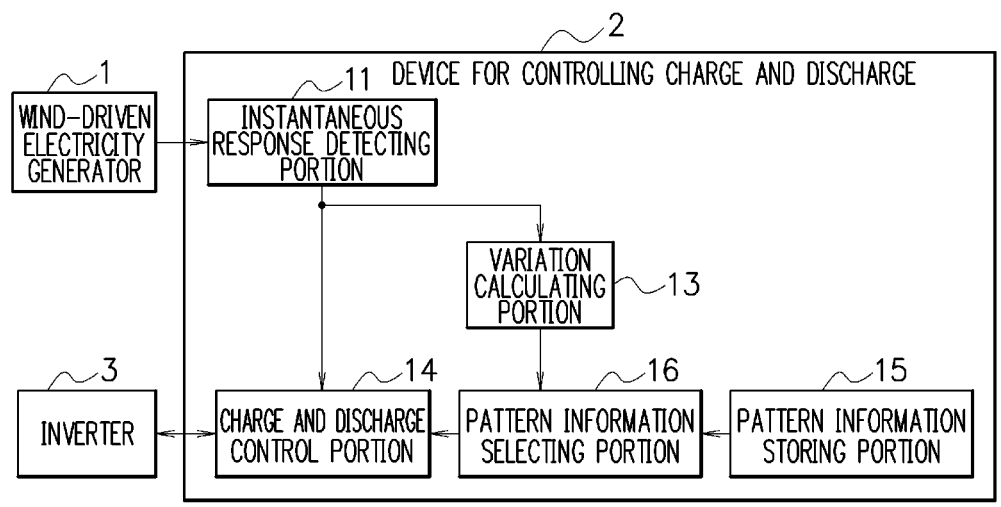
FIG. 2 is a block diagram showing an example of a functional structure of a device for controlling a charge and discharge according to the first embodiment.

FIG. 2 is a block diagram showing an example of a functional structure of the device 2 for controlling a charge and discharge according to the embodiment. As shown in FIG. 2, the device 2 for controlling a charge and discharge 2 according to the embodiment includes, as a functional structure thereof, an instantaneous response detecting portion 11, a variation calculating portion 13, a charge and discharge control portion 14, a pattern information storing portion 15 and a pattern information selecting portion 16.

The instantaneous response detecting portion 11 sequentially detects, as an instantaneous response element P, an instantaneous value of the quantity of a power generated by the wind-driven electricity generator 1. A sampling time to be a time interval for detecting the instantaneous response element P by the instantaneous response detecting portion 11 is optional and is set to be several seconds, for example.

Figures 3, 4, 5:
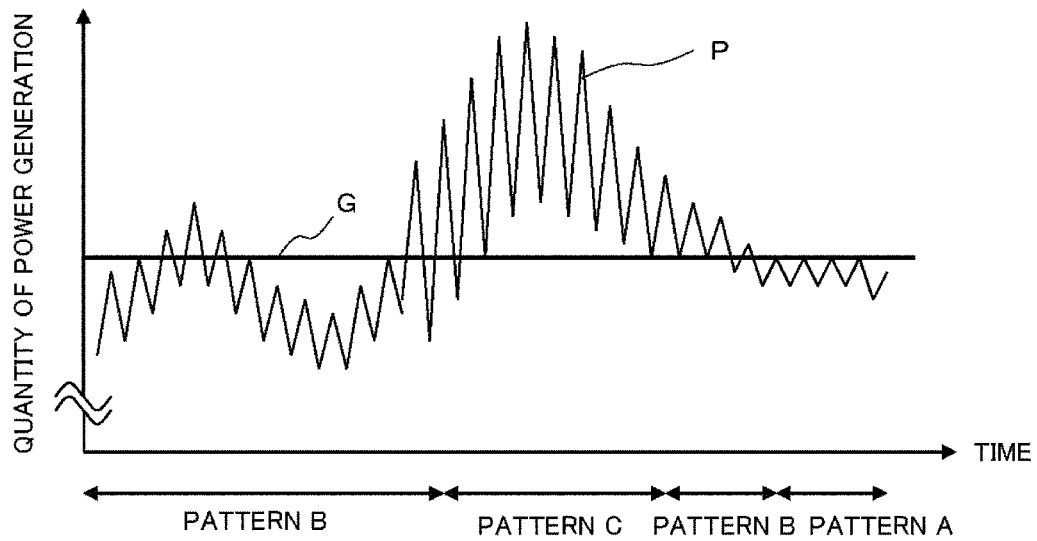
FIG. 3 is a chart for explaining a charge and discharge control corresponding to a fluctuation in an instantaneous response element according to the first embodiment.
FIG. 4 is a diagram showing an example of plural kinds of pattern information which are stored by a pattern information storing portion according to the first embodiment.
FIG. 5 is a diagram showing an example of table information provided in a pattern information selecting portion according to first and second embodiments.

FIG. 3 is a chart showing a specific example of the instantaneous response element P. Although the instantaneous response element P originally represents a discrete value for each sampling time, it is shown as a waveform obtained by connecting the discrete values for convenience of easy understanding. As shown in FIG. 3, the instantaneous response element P indicates a quantity of actual power generation of the wind-driven electricity generator 1 which is detected for each sampling time by means of the instantaneous response detecting portion 11, and the quantity of the power is greatly varied every sampling time.

The variation calculating portion 13 calculates a variation $dP/dt$ per unit time of the instantaneous response element P which is detected by the instantaneous response detecting portion 11. The charge and discharge control portion 14 controls the charge and discharge of the storage battery 4 depending on a fluctuation in the instantaneous response element P which is detected by the instantaneous response detecting portion 11.

The charge and discharge control of the storage battery 4 depending on the fluctuation in the instantaneous response element P is carried out in the following manner, for example. In other words, the charge and discharge control portion 14 controls the charge and discharge of the storage battery 4 in order to cancel a difference of the instantaneous response element P detected by the instantaneous response detecting portion 11 from a target power quantity G to be finally made constant by setting the target power quantity G as a reference. More specifically, in FIG. 3, a quantity of a power in a part in which the instantaneous response element P is larger than the target power quantity G is charged to the storage battery 4, while a quantity of a power in a part in which the instantaneous response element P is smaller than the target power quantity G is discharged from the storage battery 4.

The pattern information storing portion 15 stores plural kinds of pattern information related to a combination of instantaneous response control regions (charge and discharge control regions) representing a capacity of the storage battery 4 assigned to a control of the charge and discharge of the storage battery 4 corresponding to the fluctuation in the instantaneous response element P (the control of the charge and discharge shown in FIG. 3).

FIG. 4 is a diagram showing an example of the plural kinds of pattern information stored in the pattern information storing portion 15. The example shown in FIG. 4 indicates three kinds of pattern information A, B and C. Referring to the pattern information A, a capacity to be assigned as an instantaneous response control region is equivalent to 1 MW (megawatt) in a quantity of a power. Referring to the pattern information B, the capacity to be assigned as the instantaneous response control region is equivalent to 2 MW. Referring to the pattern information C, moreover, the capacity to be assigned as the instantaneous response control region is equivalent to 3 MW.

In the first embodiment, it is assumed that the storage battery 4 has a capacity which can store a quantity of a power of 30 MW at a maximum. In this case, a DC part of the storage battery 4 is equivalent to 29 MW (=30 MW−1 MW) in the pattern information A, the DC part of the storage battery 4 is equivalent to 28 MW (=30 MW−2 MW) in the pattern information B, and the DC part of the storage battery 4 is equivalent to 27 MW (=30 MW−3 MW) in the pattern information C.

The pattern information selecting portion 16 selects one of the plural kinds of pattern information stored in the pattern information storing portion 15 based on the variation $dP/dt$ per unit time of the instantaneous response element P which is calculated by the variation calculating portion 13, and applies an instantaneous response control region of the selected pattern information to the charge and discharge control of the storage battery 4 through the charge and discharge control portion 14.

More specifically, the pattern information selecting portion 16 includes table information representing a correspondence relationship between a range of the value of the variation $dP/dt$ and the pattern information stored in the pattern information storing portion 15. FIG. 5 is a diagram showing an example of the table information. The table information shown in FIG. 5 indicates that the pattern information A is selected when an absolute value of the variation $dP/dt$ is smaller than x (x is an optional value which is greater than zero), the pattern information B is selected when the absolute value of the variation $dP/dt$ is equal to or greater than x and is smaller than y (y is an optional value which is greater than x), and the pattern information C is selected when the absolute value of the variation $dP/dt$ is equal to or greater than y.

The pattern information selecting portion 16 selects the pattern information A in an initial condition, for example. When detecting that the absolute value of the variation $dP/dt$ which is calculated by the variation calculating portion 13 continuously applies to any of the ranges for the three kinds of values shown in FIG. 5 for a predetermined period of time or more, the pattern information selecting portion 16 switches a selection into the pattern information corresponding to the same range. The condition of the continuous application for the predetermined period of time has such a meaning as to prevent the pattern information from being unreasonably switched when the absolute value of the variation $dP/dt$ is instantaneously varied greatly.

Although the pattern information is switched when the absolute value of the variation $dP/dt$ belongs to the range of one of the values continuously for the predetermined period of time, the other methods can be employed if the meaning is met. For instance, it is also possible to obtain a last average value of the variations $dP/dt$ calculated every sampling time (the variations $dP/dt$ calculated within a last one minute, for example) and to decide any of the ranges of the values shown in FIG. 5 to which the average value belongs, thereby switching the pattern information.

Figure 6:
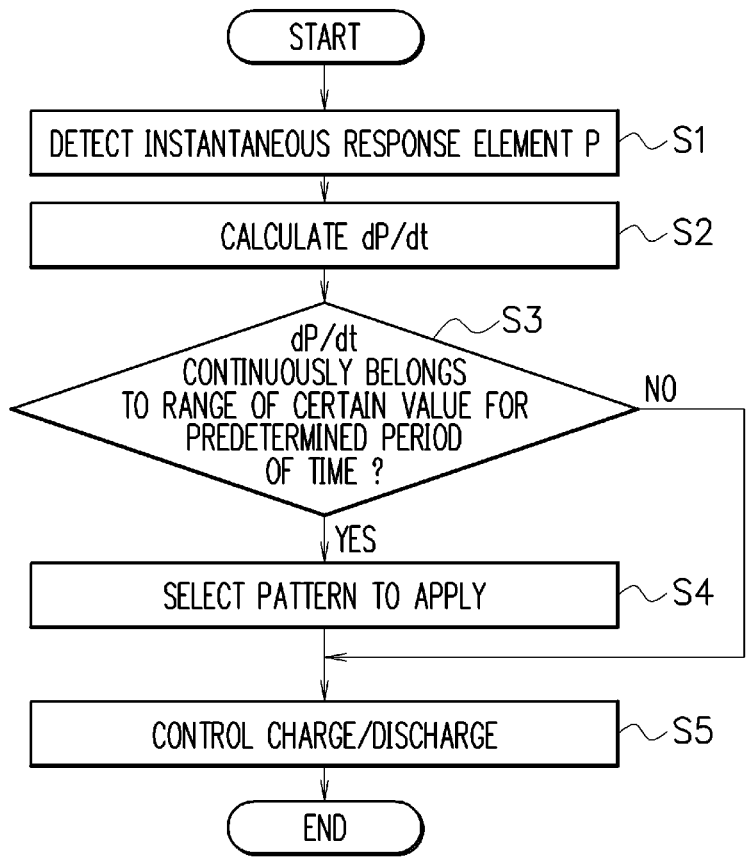
FIG. 6 is a flowchart showing an example of an operation of a device for controlling a charge and discharge according to the first embodiment.

Next, description will be given to an operation of the device 2 for controlling a charge and discharge according to the first embodiment which has the structure described above. FIG. 6 is a flowchart showing an example of the operation of the device 2 for controlling a charge and discharge according to the first embodiment. In the flowchart shown in FIG. 6, the operation is repetitively carried out every sampling time. Moreover, it is assumed that the pattern information selecting portion 16 selects the pattern information A and causes the pattern information A to apply to the charge and discharge control portion 14 when the flowchart shown in FIG. 6 is started. In other words, it is assumed that a control region corresponding to the pattern information A is set to the storage battery 4.

In FIG. 6, first of all, the instantaneous response detecting portion 11 detects, as the instantaneous response element P, an instantaneous value of the quantity of the power generated by the wind-driven electricity generator 1 (Step S1). Next, the variation calculating portion 13 calculates the variation dP/dt per unit time of the instantaneous response element P detected by the instantaneous response detecting portion 11 (Step S2). Then, the pattern information selecting portion 16 decides any of the ranges of the values shown in FIG. 5 to which the absolute value of the calculated variation dP/dt belongs and decides whether the absolute value belongs to the range of the value continuously for a predetermined period of time or more (Step S3).

If it is decided that the absolute value of the variation dP/dt belongs to a range of a certain value continuously for the predetermined period of time or more, the pattern information selecting portion 16 switches the selection into pattern information corresponding to the range of the value. More specifically, the pattern information selecting portion 16 selects pattern information corresponding to the range of the value to which the absolute value of the variation dP/dt belongs and causes an instantaneous response control region of the selected pattern information to apply to the charge and discharge control portion 14 with reference to the pattern information storing portion 15 (Step S4).

On the other hand, if the pattern information selecting portion 16 decides that the absolute value of the variation dP/dt does not continuously belong to the range of the certain value for the predetermined period of time or more, the processing of the Step S4 is not carried out but the processing proceeds to Step S5. At the Step S5, the charge and discharge control portion 14 controls the charge and discharge of the storage battery 4 depending on the fluctuation in the instantaneous response element P detected by the instantaneous response detecting portion 11 under the condition of the instantaneous response control region set and changed at the Step S4 or the instantaneous response control region before the execution of the processing of the Step S4 (Step S5).

As described above in detail, according to the device 2 for controlling a charge and discharge in accordance with the first embodiment, a size of the instantaneous response control region is adaptively changed corresponding to the variation dP/dt per unit time of the instantaneous response element P. More specifically, the instantaneous response control region is set to be decreased when the variation dP/dt of the instantaneous response element P is small, and to be increased when the variation dP/dt of the instantaneous response element P is large. For example, as shown in FIG. 3, the largest instantaneous response control region is set to the storage battery 4 based on the pattern information C in a section in which the absolute value of the variation dP/dt is equal to or greater than y, and the smallest instantaneous response control region is set to the storage battery 4 based on the pattern information A in a section in which the absolute value of the variation dP/dt is smaller than x.

Consequently, an appropriate instantaneous response control region in an almost proper quantity can be dynamically assigned to the storage battery 4 corresponding to the variation dP/dt per unit time of the instantaneous response element P which fluctuates depending on a wind condition. A residual capacity other than a capacity part assigned to the instantaneous response control region in a total capacity of the storage battery 4 can be utilized as a DC part for intentionally supplying a stable power to the circuit 100. Accordingly, it is possible to set, to the storage battery 4, a DC part which is maximized occasionally depending on the wind condition. As described above, it is possible to intentionally supply, to the circuit 100, a stable power which is as much as possible depending on the wind condition by making full use of the charge and discharge function of the storage battery 4 (that is, maximizing a quantity of actual use of the power charged to the storage battery 4).

The charge and discharge is not controlled over the whole storage battery as in the conventional art but a part of the storage battery 4 is definitely divided as the instantaneous response control region to control the charge and discharge so that a residual capacity of the charge and discharge of the storage battery 4 can easily be grasped. Therefore, it is possible to easily make a power generating plan or a power supplying plan to a circuit. Consequently, an application can be carried out simply and easily. By taking the DC part in a large quantity to decrease the capacity of the control region to be used for the charge and discharge control, moreover, it is possible to prolong a lifetime of the storage battery 4 as greatly as possible.

Figure 7:
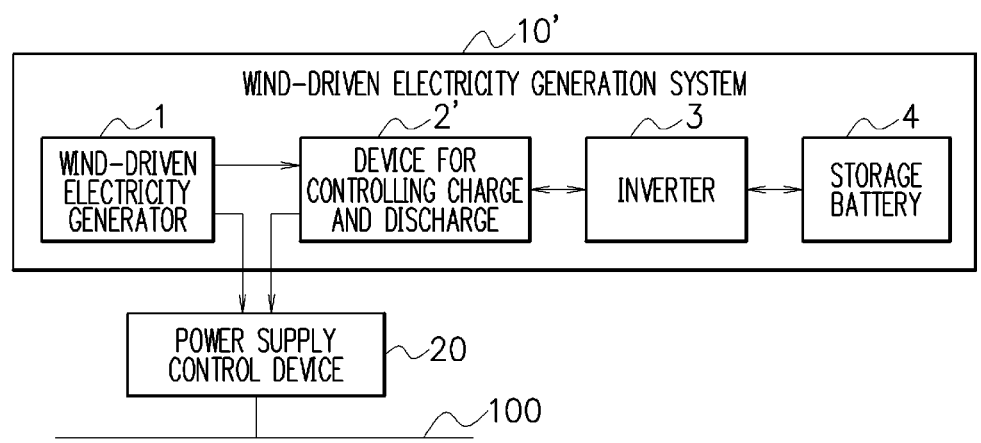
FIG. 7 is a diagram showing an example of a whole structure of a wind-driven electricity generation system of a type having a storage battery according to the second embodiment.

Next, a second embodiment according to the invention will be described with reference to the drawings. FIG. 7 is a diagram showing an example of a whole structure of a wind-driven electricity generation system 10' of a type having a storage battery according to the second embodiment. In FIG. 7, components having the same designations as those shown in FIG. 1 have the same functions, and therefore, repetitive description will be omitted.

As shown in FIG. 7, the wind-driven electricity generation system 10' according to the second embodiment includes a wind-driven electricity generator 1, a device 2' for controlling a charge and discharge', an inverter 3 and a storage battery 4. Moreover, the wind-driven electricity generation system 10' according to the second embodiment is linked to a circuit 100 of a power company through a power supply control device 20.

Figure 8:
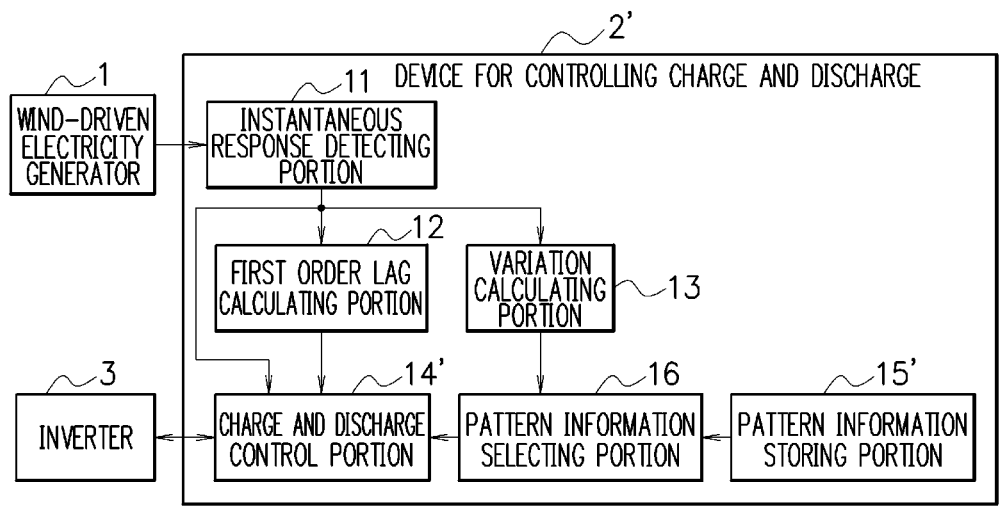
FIG. 8 is a block diagram showing an example of a functional structure of a device for controlling a charge and discharge according to the second embodiment.

FIG. 8 is a block diagram showing an example of a functional structure of the device 2' for controlling a charge and discharge according to the second embodiment. In FIG. 8, components having the same designations as those shown in FIG. 2 have the same functions, and therefore, repetitive description will be omitted. As shown in FIG. 8, the device 2' for controlling a charge and discharge according to the second embodiment includes, as a functional structure thereof, an instantaneous response detecting portion 11, a first order lag calculating portion 12, a variation calculating portion 13, a charge and discharge control portion 14', a pattern information storing portion 15' and a pattern information selecting portion 16.

The first order lag calculating portion 12 carries out a first order lag processing over an instantaneous response element P of a quantity of a generated power which is detected by the instantaneous response detecting portion 11, thereby calculating a first order lag element Q of the quantity of the power generated by the wind-driven electricity generator 1. The first order lag calculating portion 12 is constituted by a low-pass filter through a CR integrating circuit, for example. By carrying out the first order lag processing over the instantaneous response element P, it is possible to eliminate a component to be changed suddenly, thereby obtaining an outline representing a rough fluctuation tendency of the quantity of the power generation.

Figure 9:
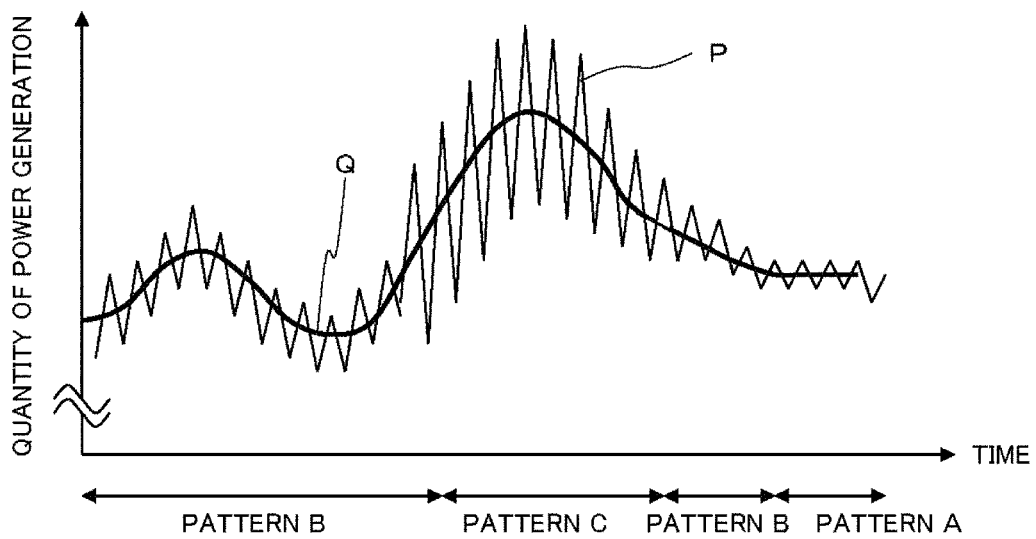
FIG. 9 is a chart for explaining a charge and discharge control corresponding to a fluctuation in an instantaneous response element according to the second embodiment.

FIG. 9 is a chart showing a specific example of the instantaneous response element P and the first order lag element Q. Although both the instantaneous response element P and the first order lag element Q are originally discrete values for each sampling time, they are shown as waveforms connecting the discrete values conveniently for easy understanding. As shown in FIG. 9, the instantaneous response element P indicates a quantity of actual power generation in the wind-driven electricity generator 1 which is detected every sampling time through the instantaneous response detecting portion 11, and the quantity of the power is greatly changed every sampling time. On the other hand, the first order lag element Q makes an outline curve representing a rough fluctuation tendency for the quantity of the actual power generation through the wind-driven electricity generator 1.

The charge and discharge control portion 14' controls the charge and discharge of the storage battery 4 depending on the fluctuation in the instantaneous response element P which is detected by the instantaneous response detecting portion 11, and furthermore, controls the charge and discharge of the storage battery 4 depending on the fluctuation in the first order lag element Q which is obtained by the first order lag calculating portion 12.

The charge and discharge control of the storage battery 4 depending on the fluctuation in the instantaneous response element P is carried out in the following manner, for example. In other words, the charge and discharge control portion 14' controls the charge and discharge of the storage battery 4 in order to cancel a difference of the instantaneous response element P detected by the instantaneous response detecting portion 11 from a reference power quantity by setting the first order lag element Q obtained through the first order lag calculating portion 12 as the reference power quantity. More specifically, in FIG. 9, the charge and discharge control portion 14' charges, to the storage battery 4, a quantity of a power in a part in which the instantaneous response element P is larger than the first order lag element Q, while discharges, from the storage battery 4, a quantity of a power in a part in which the instantaneous response element P is smaller than the first order lag element Q.

Figures 10, 11:
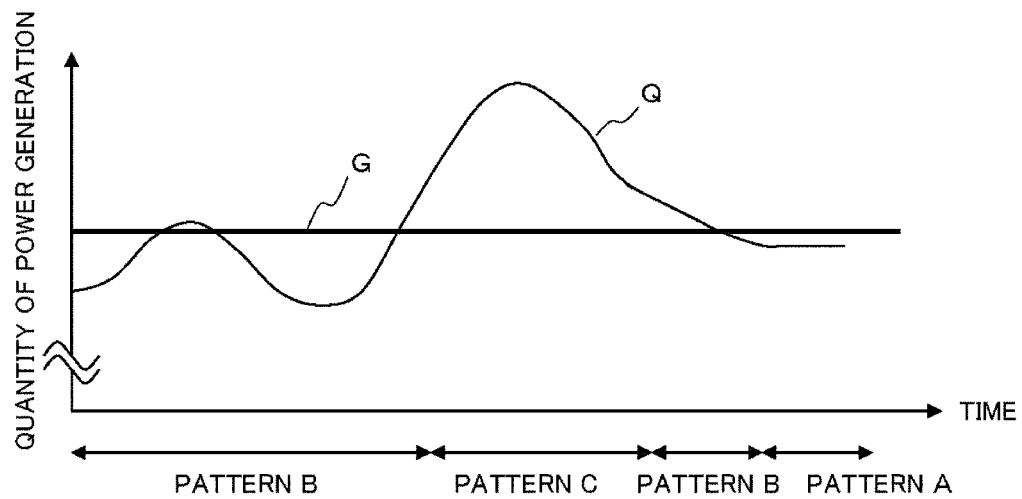
FIG. 10 is a chart for explaining a charge and discharge control corresponding to a fluctuation of a first order lag element according to the second embodiment.
FIG. 11 is a diagram showing an example of plural kinds of pattern information stored in a pattern information storing portion according to the second embodiment.

Moreover, the charge and discharge control of the storage battery 4 depending on the fluctuation in the first order lag element Q is carried out in the following manner, for example. In other words, the charge and discharge control portion 14' controls the charge and discharge of the storage battery 4 in order to cancel a difference of the first order lag element Q obtained by the first order lag calculating portion 12 from a target power quantity G to be finally made constant by setting the target power quantity G as a reference. FIG. 10 is a chart for explaining the charge and discharge control. In FIG. 10, the charge and discharge control portion 14' charges, to the storage battery 4, a quantity of a power in a part in which the first order lag element Q is larger than the constant target power quantity G, while discharges, from the storage battery 4, a quantity of a power in a part in which the first order lag element Q is smaller than the target power quantity G.

As described above, if the first order lag element Q is obtained through a calculation from the instantaneous response element P to be the quantity of the actual power generation in the wind-driven electricity generator 1 and the charge and discharge of the storage battery 4 is controlled to offset the difference from the instantaneous response element P by setting the first order lag element Q as a reference, the quantity of the power smoothed by the control (which is equivalent to the first order lag element Q) acts as a fluctuation part with respect to the constant target power quantity G to be a final target. In this case, a fluctuation range of the first order lag element Q with respect to the target power quantity G is smaller than that of the instantaneous response element P with respect to the target power quantity G. Moreover, the fluctuation range of the instantaneous response element P with respect to the first order lag element Q is also smaller than that of the instantaneous response element P with respect to the target power quantity G.

The pattern information storing portion 15' stores plural kinds of pattern information related to a combination of an instantaneous response control region representing a capacity of the storage battery 4 to be assigned to a control of the charge and discharge of the storage battery 4 (the control of the charge and discharge shown in FIG. 9) depending on the fluctuation in the instantaneous response element P and a first order lag control region representing the capacity of the storage battery 4 to be assigned to the control of the charge and discharge of the storage battery 4 (the control of the charge and discharge shown in FIG. 10) depending on the fluctuation in the first order lag element Q.

FIG. 11 is a diagram showing an example of the plural kinds of pattern information stored in the pattern information storing portion 15'. The example shown in FIG. 11 indicates three kinds of pattern information A, B and C. Referring to the pattern information A, it is assumed that a capacity to be assigned as an instantaneous response control region is equivalent to 0.5 MW (megawatt) in a quantity of a power and a capacity to be assigned as the first order lag control region is equivalent to 1 MW. Referring to the pattern information B, it is assumed that the capacity to be assigned as the instantaneous response control region is equivalent to 1 MW and a capacity to be assigned as the first order lag control region is equivalent to 2 MW. Referring to the pattern information C, moreover, it is assumed that the capacity to be assigned as the instantaneous response control region is equivalent to 1.5 MW and the capacity to be assigned as the first order lag control region is equivalent to 2.5 MW.

In the second embodiment, it is assumed that the storage battery 4 has a capacity which can store a quantity of a power of 30 MW at a maximum. In this case, a DC part of the storage battery 4 is equivalent to 28.5 MW (=30 MW−(0.5 MW+1 MW)) in the pattern information A, the DC part of the storage battery 4 is equivalent to 27 MW (=30 MW−(1 MW+2 MW)) in the pattern information B, and the DC part of the storage battery 4 is equivalent to 26 MW (=30 MW−(1.5 MW+2.5 MW)) in the pattern information C.

The pattern information selecting portion 16 selects one of the plural kinds of pattern information stored in the pattern information storing portion 15 based on the variation dP/dt per unit time of the instantaneous response element P which is calculated by the variation calculating portion 13, and causes the charge and discharge control region (the instantaneous response control region and the first order lag control region) of the selected pattern information to apply to the charge and discharge control of the storage battery 4 through the charge and discharge control portion 14. In order to select the pattern information, the pattern information selecting portion 16 includes the table information shown in FIG. 5.

Figure 12:
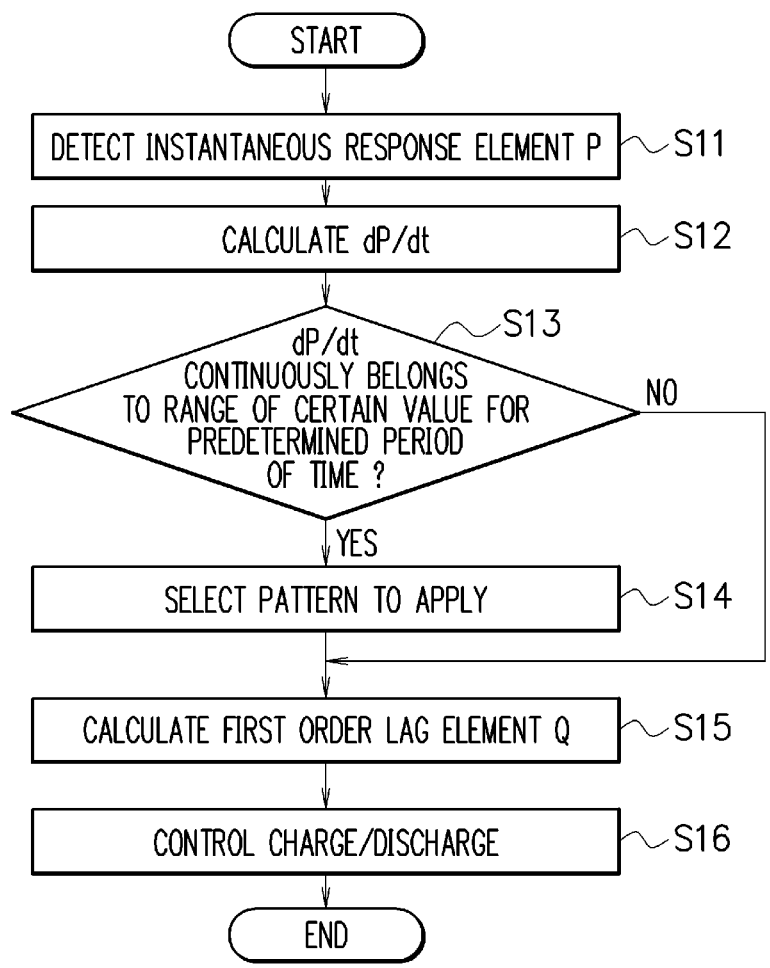
FIG. 12 is a flowchart showing an example of an operation of the device for controlling a charge and discharge according to the second embodiment.

Next, description will be given to an operation of the device 2' for controlling a charge and discharge according to the second embodiment which has the structure described above. FIG. 12 is a flowchart showing an example of the operation of the device 2' for controlling a charge and discharge according to the second embodiment. In the flowchart shown in FIG. 12, the operation is repetitively carried out every sampling time. Moreover, it is assumed that the pattern information selecting portion 16 selects the pattern information A and causes the pattern information A to apply to the charge and discharge control portion 14 when the flowchart shown in FIG. 12 is started. In other words, it is assumed that a charge and discharge control region (the instantaneous response control region and the first order lag control region) corresponding to the pattern information A is set to the storage battery 4.

Processings of Steps S11 to S14 shown in FIG. 12 are the same as those of the Steps S1 to S4 shown in FIG. 6. At the Step S14, the pattern information selecting portion 16 selects pattern information corresponding to the range of the value to which the absolute value of the variation dP/dt belongs and causes a charge and discharge control region of the selected pattern information to apply to the charge and discharge control portion 14 with reference to the pattern information storing portion 15.

Next, the first order lag calculating portion 12 carries out a first order lag processing over the instantaneous response element P detected by the instantaneous response detecting portion 11, thereby calculating the first order lag element Q of the quantity of the power generated by the wind-driven electricity generator 1 (Step S15). Furthermore, the charge and discharge control portion 14' controls the charge and discharge of the storage battery 4 depending on the fluctuation in the instantaneous response element P detected by the instantaneous response detecting portion 11, and furthermore, controls the charge and discharge of the storage battery 4 depending on the fluctuation in the first order lag element Q which is obtained by the first order lag calculating portion 12 under a condition of the charge and discharge control region set and changed at the Step S14 or the charge and discharge control region before the execution of the processing in the Step S14 (Step S16).

As described above in detail, according to the device 2' for controlling a charge and discharge in accordance with the second embodiment, the charge and discharge of the storage battery 4 is controlled in a division into the control based on the fluctuation in the instantaneous response element P and the control based on the fluctuation in the first order lag element Q. The first order lag element Q makes an outline curve representing a rough fluctuation tendency for the instantaneous response element P, and the first order lag element Q and the instantaneous response element P have a correlation. By controlling the charge and discharge based on the difference of the instantaneous response element P from the first order lag element Q having the correlation, it is possible to carry out the charge and discharge control more minutely as compared with the first embodiment in which the charge and discharge control is carried out based on the difference of the instantaneous response element P from the target power quantity G having no correlation (see FIG. 9). As a result, the instantaneous response element P is smoothed like the outline of the first order lag element Q, and the difference of the first order lag element Q from the target power quantity G remains as shown in FIG. 10. However, the difference is smoothed into the target power quantity G through another charge and discharge control based on the difference. The target power quantity G and the first order lag element Q have no correlation. However, the first order lag element Q has an instantaneous fluctuation range which is not great differently from the instantaneous response element P. Therefore, the charge and discharge control can easily be carried out. By both the control based on the fluctuation in the instantaneous response element P and the control based on the fluctuation in the first order lag element Q, consequently, it is possible to generate a power of high quality which is stabilized more greatly.

According to the device 2' for controlling a charge and discharge in accordance with the second embodiment, furthermore, the combination of the instantaneous response control region and the first order lag control region is adaptively changed corresponding to the variation dP/dt per unit time of the instantaneous response element P. More specifically, the control region is set to be decreased when the variation dP/dt of the instantaneous response element P is small, and to be increased when the variation dP/dt of the instantaneous response element P is large. For example, as shown in FIG. 9, the largest control region is set to the storage battery 4 based on the pattern information C in a section in which the absolute value of the variation dP/dt is equal to or greater than y, and the smallest control region is set to the storage battery 4 based on the pattern information A in a section in which the absolute value of the variation dP/dt is smaller than x.

Consequently, an appropriate charge and discharge control region in an almost proper quantity can be dynamically assigned to the storage battery 4 corresponding to the variation dP/dt per unit time of the instantaneous response element P which fluctuates depending on a wind condition. Accordingly, it is possible to set, to the storage battery 4, a DC part to be maximized occasionally depending on the wind condition. Thus, the charge and discharge control region is limited. By making full use of the charge and discharge function of the battery 4, consequently, it is possible to intentionally supply, to the circuit 100, a stable power which is as much as possible depending on the wind condition.

Depending on a permitted fluctuation ratio of the power to be smoothed and supplied to the circuit 100 (a rate of the fluctuation range of the smoothed power with respect to a power which is equivalent to the total capacity of the storage battery 4), it is possible to select and apply to either the first embodiment or the second embodiment. Although it has been described that the charge and discharge control portions 14 and 14' smooth the generated power into the target power quantity G in the first and second embodiments, the smoothed power actually fluctuates in a very small quantity. The fluctuation range has a tolerance. The first embodiment can be applied to the case in which the permitted fluctuation ratio representing the tolerance is a precision of 5% or more, or a season in which a change in the wind condition is comparatively gentle. On the other hand, the second embodiment can be applied to the case in which the permitted fluctuation ratio is obtained under a condition which is stricter than the precision of 5% or a season in which the change in the wind condition is great.

Both of the first and second embodiments are only illustrative for an implementation of an execution of the invention and the technical scope of the invention should not be construed to be restrictive by them. In other words, the invention can be carried out in various forms without departing from the spirit or main features thereof.

Industrial Applicabilty

The invention can be utilized in a wind-driven electricity generation system of a type having a storage battery and a device for controlling a charge and discharge of the storage battery which have a technique for stabilizing a power output to a circuit linked to a wind-driven electricity generator without an influence of an air quantity.

The invention claimed is:

1. A device for controlling a charge and discharge of a storage battery in a wind-driven electricity generation system of a type having the storage battery which has a wind-driven electricity generator, driven by a wind power, for generating a power to be supplied to a power circuit, and the storage battery for charging/discharging a part of the power generated by the wind-driven electricity generator, comprising:
   an instantaneous response detecting portion for sequentially detecting, as an instantaneous response element, an instantaneous value of a quantity of a power generated by the wind-driven electricity generator;
   a variation calculating portion for calculating a variation per unit time of the instantaneous response element which is detected by the instantaneous response detecting portion;
   a charge and discharge control portion for controlling the charge and discharge of the storage battery depending on a fluctuation in the instantaneous response element detected by the instantaneous response detecting portion;
   a pattern information storing portion for storing plural kinds of pattern information related to an instantaneous response control region representing a capacity of the storage battery which is to be assigned to the control of the charge and discharge of the storage battery depending on the fluctuation in the instantaneous response element; and
   a pattern information selecting portion for selecting one of the plural kinds of pattern information stored in the pattern information storing portion and applying the pattern information to the control of the charge and discharge of the storage battery through the charge and discharge control portion based on the variation per unit time of the instantaneous response element which is calculated by the variation calculating portion.

2. The device for controlling a charge and discharge of the storage battery in the wind-driven electricity generation system of the type having the storage battery according to claim 1, wherein the charge and discharge control portion controls the charge and discharge of the storage battery to cancel a difference of the instantaneous response element detected by the instantaneous response detecting portion from a target power quantity.

3. The device for controlling a charge and discharge of the storage battery in the wind-driven electricity generation system of the type having the storage battery according to claim 1, wherein the pattern information selecting portion includes table information representing a correspondence relationship between a range of a value of the variation and the pattern information stored in the pattern information storing portion, and switches a selection into pattern information corresponding to a range of a certain value when detecting that an absolute value of the variation per unit time of the instantaneous response element detected by the variation detecting portion applies to the same range continuously for a predetermined period of time or more.

4. The device for controlling a charge and discharge of the storage battery in the wind-driven electricity generation system of the type having the storage battery according to claim 1, further comprising a first order lag calculating portion for carrying out a first order lag processing over the instantaneous response element detected by the instantaneous response detecting portion, thereby obtaining a first order lag element of a quantity of a power generated by the wind-driven electricity generator,
   the charge and discharge control portion controlling the charge and discharge of the storage battery depending on a fluctuation in the instantaneous response element detected by the instantaneous response detecting portion and controlling the charge and discharge of the storage battery depending on a fluctuation in the first order lag element which is obtained by the first order lag calculating portion,
   the pattern information storing portion storing plural kinds of pattern information related to a combination of an instantaneous response control region representing a capacity of the storage battery which is to be assigned to the control of the charge and discharge of the storage battery depending on the fluctuation in the instantaneous response element and a first order lag control region representing a capacity of the storage battery which is to be assigned to the control of the charge and discharge of the storage battery depending on the fluctuation in the first order lag element, and
   the pattern information selecting portion selecting one of the plural kinds of pattern information stored in the pattern information storing portion and causing the same pattern information to apply to the control of the charge and discharge of the storage battery through the charge and discharge control portion based on a variation per unit time of the instantaneous response element obtained by the variation calculating portion.

5. The device for controlling a charge and discharge of the storage battery in the wind-driven electricity generation system of the type having the storage battery according to claim 4, wherein the charge and discharge control portion controls the charge and discharge of the storage battery to cancel a difference of the instantaneous response element detected by the instantaneous response detecting portion from a reference power quantity to which the first order lag element obtained by the first order lag calculating portion is set and controls the charge and discharge of the storage battery to cancel a difference of the first order lag element obtained by the first order lag calculating portion from a target power quantity.

6. The device for controlling a charge and discharge of the storage battery in the wind-driven electricity generation system of the type having the storage battery according to claim 4, wherein the pattern information selecting portion includes table information representing a correspondence relationship between a range of a value of the variation and the pattern information stored in the pattern information storing portion, and switches a selection into the pattern information corresponding to a range of a certain value when detecting that an absolute value of the variation per unit time of the instantaneous response element detected by the variation detecting portion continuously applies to the same range for a predetermined period of time or more.

7. The device for controlling a charge and discharge of the storage battery in the wind-driven electricity generation system of the type having the storage battery according to claim 5, wherein the pattern information selecting portion includes table information representing a correspondence relationship between a range of a value of the variation and the pattern information stored in the pattern information storing portion, and switches a selection into the pattern information corresponding to a range of a certain value when detecting that an absolute value of the variation per unit time of the instantaneous response element detected by the variation detecting portion continuously applies to the same range for a predetermined period of time or more.

8. A wind-driven electricity generation system of a type having a storage battery comprising:
- a wind-driven electricity generator, driven by a wind power, for generating a power to be supplied to a power circuit;
- the storage battery for charging/discharging a part of the power generated by the wind-driven electricity generator; and
- a device for controlling the charge and discharge of the storage battery,
- the device for controlling the charge and discharge including:
  - an instantaneous response detecting portion for sequentially detecting, as an instantaneous response element, an instantaneous value of a quantity of the power generated by the wind-driven electricity generator;
  - a variation calculating portion for calculating a variation per unit time of the instantaneous response element which is detected by the instantaneous response detecting portion;
  - a charge and discharge control portion for controlling the charge and discharge of the storage battery depending on the instantaneous response element detected by the instantaneous response detecting portion;
  - a pattern information storing portion for storing plural kinds of pattern information related to an instantaneous response control region representing a capacity of the storage battery which is to be assigned to the control of the charge and discharge of the storage battery depending on the instantaneous response element; and
- a pattern information selecting portion for selecting one of the plural kinds of pattern information stored in the pattern information storing portion and causing the pattern information to apply to the control of the charge and discharge of the storage battery through the charge and discharge control portion based on the variation per unit time of the instantaneous response element which is calculated by the variation calculating portion.

* * * * *